United States Patent Office 2,718,454
Patented Sept. 20, 1955

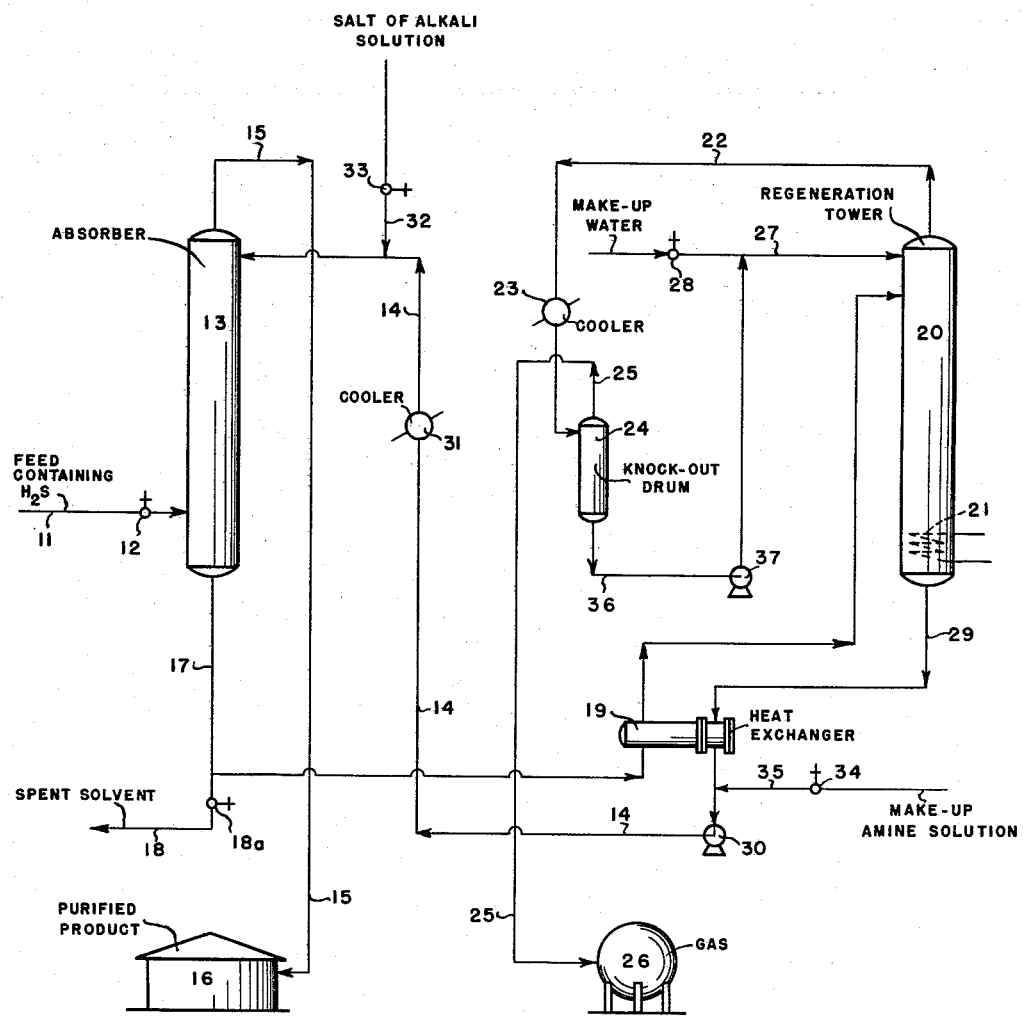

2,718,454

RECOVERY OF ACIDIC GASES

Roger Wylie, Goose Creek, Tex., assignor, by mesne assignments, to Esso Research and Engineering Company, Elizabeth, N. J., a corporation of Delaware Application October 11, 1947, Serial No. 779,298

14 Claims. (Cl. 23—2)

The present invention is directed to an improved method for removing acidic gases from fluids containing them. More particularly, the invention is concerned with a method for increasing the ability of an aqueous amine solution to dissolve acidic gases. The invention is also directed to an improved treating reagent for removing acid gases from fluids containing them.

Prior to the present invention, it has been known to treat gases and liquids such as mixtures of gases including carbon dioxide and hydrogen sulfide and light hydrocarbons such as butane, propane, ethane, methane, and the like with amine solutions such as monoethanolamine, diethanolamine, and triethanolamine to remove acidic gases such as carbon dioxide and hydrogen sulfide. The amine usually contacts gases and liquids as an aqueous solution containing approximately from 10% to 30% of the particular amine in an absorber tower with the aqueous amine solution contacting the acidic fluid countercurrently. Usually the absorption tower is equipped with contacting means such as bubble cap plates or packing or any other material which will insure good contact between gases and liqiuds or between liquids and liquids. The purified gas, free of acidic bodies, passes through and out of the absorber while the acidic contaminants are absorbed in the amine solution. The amine solution is removed from the absorber, heated, and introduced into a tower where it is subjected to stripping in the presence of steam, the steam being generated in situ by heating of the aqueous solution. The steam effectively removes the acidic bodies which are released from the regeneration tower. After the amine solution has been freed of the contaminants, it may be reused in the process. The water which is released as steam is condensed and returned to the regenerating tower in which the contaminants are released from the amine solution to maintain the solution at its original strength and to provide reflux. The operation is usually conducted with very little if any amine solution required as make-up and the only loss being that due to entrainment and minor leaks. When make up is required, fresh amine solution may be added.

There is one great objection to this process in that the amine solution, after being used for long periods of time, becomes contaminated with materials which form emulsions between the fluid being treated and the amine. These emulsions cause series losses in capacity. For example, after approximately 2 months' operation, a commercial unit having an initial capacity of 4000 barrels per day of a feed mixture of propane and propylene which contained hydrogen sulfide was reduced in capacity to 2500 barrels per day due to formation of emulsions. The amount of amine solution had been reduced from 2500 barrels per day to 1500 barrels per day. The contaminating bodies are believed to be formed from organic contaminants contained in the feed mixture such as objectionable unsaturated hydrocarbons, organic acids, and the like which may be polymerized by or form salts with the solution. These polymerized or salt-like bodies become admixed with inorganic compounds such as iron sulfide which may be present in the vessels by reaction of sulfur with iron or with elemental carbon which is usually present in petroleum refining equipment. As a result, a heterogeneous mixture of organic salts, polymers, inorganic metal compounds, and carbonaceous material may form which tend to stabilize the emulsions resulting from the contact of the amine solution with the hydrocarbon fluids. Thus, the capacity of a commercial unit may be seriously affected as illustrated before.

The process as described above even at its best when emulsion difficulties are not encountered, like other processes in which reactions of a similar nature take place, must have equipment designed for it to provide for the capacity or through-put of acid-containing materials that it is designed to process. If any unexpected increase in requirements should occur, either the degree of removal of acidic bodies from the fluid may be lessened or an amount of the acid-containing fluid will not be processible. Either one of the alternatives is undesirable since the acid-containing fluid which is unprocessible is unsuitable in other reactions due to the acids present or the presence of a small quantity of acidic bodies is deleterious in the other reactions in which it is desired to use the product. Thus, if a process could be provided to increase the capacity of a unit processing a fluid containing acidic gases over and above the design requirements, a considerable economic gain would be realized.

It is, therefore, the main object of the present invention to provide a process for increasing the capacity of a given unit employing an amine solution to treat acidic fluids such as hydrogen sulfide and carbon dioxide containing gases or liquid hydrocarbons.

Another object of the invention is to provide an improved process in which an aqeuous amine solution contacts fluids containing acidic bodies.

A still further object is to treat an acid-containing fluid, such as propane containing hydrogen sulfide or carbon dioxide, with an aqueous amine solution to which has been added an agent which increases the solubility of the acidic bodies therein.

A further object of the present invention is to provide an improved treating reagent for removing acid gases from fluids containing them.

I have now discovered that the addition of certain compounds of an alkali metal to aqueous amine solution, such as monoethanolamine, diethanolamine, and triethanolamine, affords substantially increased ability of the aqueous amine solution to remove acidic bodies from fluids containing them. Therefore, the objects of the present invention may be achieved by adding to an amine solution, which is employed to contact acidic-containing fluids, a small quantity of a compound of an alkali metal which is allowed to remain and dissolve in the aqueous amine solution.

The invention may be described briefly as involving the contacting of a feed hydrocarbon mixture either in the gaseous or liquid phase with an aqueous amine solution of the type mentioned before to cause selective absorption of hydrogen sulfide or carbon dioxide from the hydrocarbon thus leaving the hydrocarbon substantially free of these materials for use in petroleum refining processes such as catalytic conversion operations as illustrated by polymerization processes and the like. The amine solution has added to it prior to the contacting operation an amount of an alkali metal compound in an amount not to exceed the solubility of the alkali metal compound in the aqueous amine solution. Ordinarily, an amount of alkali metal compound in the range from about 3% to 10% will be satisfactory. After the amine solution containing the alkali metal compound has contacted the acidic-containing fluid, the substantially acid-free fluid is separated from the amine solution. The amine solution is then heated to a temperature to cause the release of the acidic bodies by the action of steam generated in situ. The acidic gases and water removed from the amine solution are separated, the water returned to the amine solution, and the acidic gases discarded from the process.

To explain the beneficial aspects of the present invention, it is believed that as the solution circulates, reaction products of organic acids with the amine solution, polymerized bodies resulting from polymerization of unsaturated hydrocarbons, carbonaceous material, iron sulfide, and the like accumulate in the aqueous amine solution. After this material has accumulated to a certain extent, it is believed that it may stabilize the emulsion which may form between the amine solution and the hydrocarbon and cause loss of the amine solution by entrainment with the effluents from the process. Thus, it is believed that the addition of the alkali metal compound may tend to prevent the formation of the emulsions and thus prevent the loss of the amine solution by entrainment, for example, with the effluent, substantially acid free fluid, which has been contacted with the aqueous amine solution.

As another postulate to explain the beneficial aspects of my invention, it is suggested that the alkali metal compound may form an unidentified reaction product which is, perhaps, a loosely bonded chemical compound with the amine dissolved in water and that this unidentified compound may have enhanced affinity to remove acid gases such as hydrogen sulfide and carbon dioxide from fluids containing them. This postulate is offered by way of explanation and should not be construed as limiting the invention in any manner whatsoever.

The ability of the amine solution of the type mentioned before, to which has been added a small amount of an alkali metal compound, to remove acid gases such as hydrogen sulfide and carbon dioxide from fluids containing them is indeed surprising but bears out the postulate that a complex compound may be formed since the total mols by titration of ethanol amine plus the added alkali metal compound is less than the sum total of the two, when titrated alone.

The alkali metal compounds which are effective in the practice of the present invention may include sodium hydroxide, sodium hydrosulfide, sodium sulfide, sodium bicarbonate, sodium carbonate, lithium hydroxide, lithium hydrosulfide, lithium sulfide, lithium bicarbonate, lithium carbonate, potassium hydroxide, potassium hydrosulfide, potassium bicarbonate, and potassium carbonate.

As mentioned before, the concentration of alkali metal compound employed may vary within a wide range. Ordinarily, an amount of the alkali metal compound as the alkali metal in the range between about 0.1% and 10% by weight of the solution may be used.

The compound of the alkali metal may be injected into the amine solution as a solution of the alkali metal compound in water. It may be desirable to inject the solution of the compound of the alkali metal continuously or intermittently as may be desired provided that the concentration of the alkali metal compound in the amine solution does not exceed the solubility thereof.

The invention will now be further illustrated by reference to the drawing in which the sole figure illustrates a preferred mode of practicing the invention.

Referring now to the drawing, numeral 11 designates a charge line through which a feed hydrocarbon mixture, for example a mixture of propane and propylene containing hydrogen sulfide, is introduced into the system. Line 11 is controlled by valve 12 to regulate the admission of the feed hydrocarbon mixture. Line 11 discharges the feed hydrocarbon which may be in a liquid or gaseous condition into an absorption tower 13. Absorption tower 13 may be a conventional absorption tower equipped with bubble cap trays or it may be an absorption tower which is provided with a packing such as any one of the well known packings available to the industry. When gases comprise the feed mixture, the absorption tower will be preferentially provided with bubble cap trays while when a liquid fluid is the feed mixture, other packings of the types well known to the industry may be used. The feed hydrocarbon mixture introduced by line 12 into the absorber 13 flows upwardly therein and is countercurrently contacted with aqueous amine solutions, such as diethanolamine in a concentration in water in the range between 10% and 30%, which is introduced by line 14. The aqueous amine solution flows countercurrently to the incoming feed, downwardly in absorber 13, and effectively removes carbon dioxide and hydrogen sulfide and allows the release of a substantially purified propane-propylene mixture by line 15 which discharges the purified product into a storage tank 16 for use as a feed stock, for example, in a thermal polymerization process.

The amine solution containing absorbed hydrogen sulfide or carbon dioxide or both of them dependent on the contaminants in the propane-propylene mixture is withdrawn from absorber 13 by line 17 and passed through a heat exchanger 19 to a regeneration tower 20. If desired the spent solvent may be withdrawn through outlet line 18 controlled by valve 18a. Regeneration tower 20 is provided with an internal heating coil or an external reboiler as illustrated by heating means 21 to allow the adjustment of temperature and pressure and to cause release of the acid bodies absorbed from the incoming feed mixture. The application of heat by heating means 21 causes the aqueous amine solution to boil and release steam which effectively strips off the absorbed bodies and releases them through line 22. The effluent gases from regenerator 20 flow through condenser or cooler 23 and then into a knock-out drum or trap 24. In drum 24 a separation is made between the acid gases, such as illustrated by hydrogen sulfide and carbon dioxide, and the water which is driven off from the amine solution in regenerator 20. The acid gases are released from the top of drum 24 by line 25 and are discharged into a tank 26 for further use or for release as may be desired.

The water condensed by cooling is passed through condenser 23, withdrawn from drum 24 by line 36, and is pumped by pump 37 to the top of absorber 20 by way of line 27 to allow maintenance of the amine solution at its desired concentration and also to provide reflux in separating the effluent gases from the amine solution. Make up water may be added by opening valve 28 in line 27. The regenerated amine solution is then returnd to absorber 13 through line 29 which passes through heat exchanger 19 to give up its heat to the amine solution introduced into absorber 20. Line 29 terminates in pump 30 which then causes the regenerated amine solution to be pumped through line 14 and cooler 31 to the top of absorption tower 13 as has been described. In accordance with the practice of the present invention, there is introduced into the aqueous amine solution flowing into absorption tower 13 by line 14 a compound of an alkali metal such as, for example, a solution of sodium hydroxide. A readily available source of the compound of an alkali metal which may be found as a by-product of refining operations is the so-called spent caustic solution which includes a mixture of sodium sulfide and sodium hydroxide in a small amount. For purpose of illustration, it is assumed that a solution of sodium hydroxide is introduced into line 14 by line 32 controlled by valve 33 in an amount sufficient to give about 6 to 7% of sodium ions in the solution. Inclusion of this amount of sodium ions in the aqueous amine solution effectively increases the ability of the circulating amine solution to remove carbon dioxide and hydrogen sulfide in the feed introduced by line 11. Although the present invention effectively reduces the amount of amine solution which may be carried out in the effluent gas in lines 15 and 22, respectively, from time to time it may be desirable to add aqueous amine solution to the system by opening valve 34 in line 35 connecting line 29 to a source of amine solution not shown.

In order to illustrate the invention further, an amine solution such as diethanolamine circulated in a process as described in conjunction with the drawing had added to it an amount of spent caustic to give a concentration of sodium ions of 6.5% in the solution. Prior to the addition of the spent caustic, the maximum charge rate of a mixture of propylene and propane which contained hydrogen sulfide was 4000 barrels per day. After the amount of spent caustic mentioned had been added, the unit had its capacity increased to the extent of at least 5300 barrels per day of a propane-propylene mixture which was substantially freed of hydrogen sulfide after treatment with the amine solution of the present invention. As much as 6000 to 7000 barrels per day of feed for the same circulation of amine solution has been charged. The amount of amine solution circulated in accordance with the present invention in which the amine contained sodium ions was 2200 barrels per day whereas prior to the addition of the spent caustic, a circulation rate of amine solution of 2500 to 2800 barrels per day was required for 3000 barrels per day of propane. The amine loss over a 16 day period in accordance with the present invention was only 0.02 barrel per day whereas prior to the practice of the present invention, in which a salt of an alkali metal was added to the amine solution, the loss of amine solution was 0.3 to 0.5 barrel per day.

The conditions employed in the practice of the present invention will depend, of course, on whether or not the acid-containing fluids, such as hydrocarbon gases or liquids, are in the gaseous or liquid phase. If a light hydrocarbon such as a propane-propylene mixture is contacted with the amine solution with the hydrocarbon in the liquid phase, it will be necessary to impose a pressure to maintain the propane-propylene mixture as a liquid. As exemplary of the conditions employed in the practice of the present invention, a propane-propylene stream containing approximately 1 to 1.5 mol per cent of hydrogen sulfide was charged. Treatment with the amine solution with propane-propylene mixture in the liquid phase reduced the hydrogen sulfide content to less than 0.001 mol per cent. A temperature was employed in the practice of the present invention in the absorption tower 13 in the range between 90° and 110° F. while a pressure in the range between 300 and 320 pounds per square inch gauge was used.

To emphasize further the advantage of the present invention, there are presented in the following table the circulation rates of a feed propane containing hydrogen sulfide and the circulation rates of the amine solution together with the amine lost from the system and the per cent of diethanolamine (DEA) in the water removed with the acidic gases:

Table I

| Before Spent Caustic Addition | March | April | May |
| --- | --- | --- | --- |
| Propane rates, B./D | 2,990 | 2,350 | 3,200 |
| Amine rates, B./D | | 2,200 | 2,500 |
| Amine loss, B./D | 0.55 | 0.31 | 0.41 |
| Percent DEA in Water | 9 | 12.5 | 9 |

The results presented in Table I are compared with the results obtained after injection of spent caustic to the circulating amine solution. These results are presented in the following table:

Table II

| After Spent Caustic Addition | June | | July | |
| --- | --- | --- | --- | --- |
| | 3–19 | 19–25 | 25–3 | 3–10 |
| Propane rate, B./D | 3,100 | 3,300 | 2,810 | 4,830 |
| Amine rate, B./D | 2,100 | 2,100 | 2,100 | 2,500 |
| Amine loss, B./D | 0.025 | 0.066 | 0.15 | |
| Percent DEA in Water | 12.4 | 12.0 | 11.6 | 10.4 |
| Percent Na (Total) | 6.57 | 6.21 | 6.03 | 5.5 |
| Percent of Total Na combined with DEA | 30.9 | 33.3 | 35.3 | 37.8 |

It will be apparent from the foregoing data that substantially increased amounts of propane were charged to the unit in the practice of the present invention over conventional operations with substantially the same amount of amine solution circulated. It will also be apparent that substantially less amine was lost while practicing the present invention than in conventional practice.

The nature and objects of the present invention having been fully described and illustrated, what I wish to claim as new and useful and to secure by Letters Patent is:

1. A method for removing acidic gases from hydrocarbon fluids containing them which comprises contacting a hydrocarbon fluid containing an acid gas selected from the group consisting of hydrogen sulfide and carbon dioxide with an aqueous solution of an ethanolamine in admixture with an amount of a compound selected from the group consisting of sodium hydroxide, sodium sulfide and sodium carbonate sufficient to liberate a substantial portion of the amine that combines with carbon compound impurities present in the hydrocarbon fluid.

2. A method for removing acidic gases from hydrocarbon fluids containing them which comprises contacting a hydrocarbon fluid containing an acid gas selected from the group consisting of hydrogen sulfide and carbon dioxide with an aqueous solution of ethanolamine in admixture with an amount of a compound selected from the group consisting of sodium hydroxide, sodium hydrosulfide, sodium sulfide, sodium bicarbonate, sodium carbonate, lithium hydroxide, lithium hydrosulfide, lithium sulfide, lithium bicarbonate, lithium carbonate, potassium hydroxide, potassium hydrosulfide, potassium bicarbonate and potassium carbonate in the range between 0.1 and 10% by weight of the solution in the presence of a heterogenous mixture of organic salts, polymers, inorganic metal compounds and carbonaceous material.

3. A method for removing acidic gases from hydrocarbon fluids containing them which comprises contacting a hydrocarbon fluid containing an acid gas selected from the group consisting of hydrogen sulfide and carbon dioxide with an aqueous solution of ethanolamine in admixture with an amount of a compound selected from the group consisting of sodium hydroxide, sodium hydrosulfide, sodium sulfide, sodium bicarbonate, sodium carbonate, lithium hydroxide, lithium hydrosulfide, lithium sulfide, lithium bicarbonate, lithium carbonate, potassium hydroxide, potassium hydrosulfide, potassium bicarbonate, and potassium carbonate, in the range between 0.1 and 10% by weight of the solution in the presence of a heterogenous mixture of organic salts, polymers, inorganic metal compounds and carbonaceous material to remove substantially all of said acid gas from said hydrocarbon fluid, separating substantially acid gas free hydrocarbon fluid from said aqueous solution and heating said separated aqueous solution to a temperature sufficient to generate steam and to cause removal of acid gas from said separated solution.

4. A method for removing acidic gases from hydrocarbon fluids containing them which comprises contacting a hydrocarbon fluid containing an acid gas selected from the group consisting of hydrogen sulfide and carbon dioxide with an aqueous solution of an ethanolamine in admixture with an amount of a compound selected from the hydroxides, sulfides and carbonates of the alkali metals in the range between 0.1% and 10% by weight of the solution, said solution containing a heterogeneous mixture of organic salts, polymers, inorganic metal compounds and carbonaceous material.

5. A method for removing acidic gases from hydrocarbon fluids containing them which comprises contacting a hydrocarbon fluid containing an acid gas selected from the group consisting of hydrogen sulfide and carbon dioxide with an aqueous solution of an ethanolamine in admixture with an amount of a compound selected from the hydroxides, sulfides and carbonates of the alkali metals in the range between 0.1% and 10% by weight of the solution, said solution containing a heterogeneous mixture of organic salts, polymers, inorganic metal compounds and carbonaceous material, to remove substantially all of said acid gas from said hydrocarbon fluid, separating substantially acid-free hydrocarbon fluid from said aqueous solution and heating said separated aqueous solution to a temperature sufficient to generate steam and to cause removal of acid gas from said solution.

6. A method in accordance with claim 5 in which the ethanolamine is monoethanolamine.

7. A method in accordance with claim 5 in which the ethanolamine is diethanolamine.

8. A method in accordance with claim 5 in which the ethanolamine is a triethanolamine.

9. A method for removing hydrogen sulfide and carbon dioxide from a mixture of hydrogen sulfide, carbon dioxide, and a normally gaseous hydrocarbon which comprises contacting said normally gaseous hydrocarbon containing hydrogen sulfide and carbon dioxide with an aqueous solution of an ethanolamine in admixture with an amount of a compound selected from the hydroxides, sulfides and carbonates of alkali metals in the range between 0.1% and 10% by weight of the solution, said solution containing a heterogeneous mixture of organic salts, polymers, inorganic metal compounds and carbonaceous materials, to remove substantially all of said hydrogen sulfide and carbon dioxide from said normally gaseous hydrocarbon, separating normally gaseous hydrocarbon substantially free of hydrogen sulfide and carbon dioxide from said aqueous solution and recovering same, and heating said recovered aqueous solution to a temperature sufficient to generate steam and to remove substantially all of said hydrogen sulfide and carbon dioxide from said aqueous solution.

10. A method for removing acidic gases from hydrocarbon fluids containing them which comprises contacting a liquefied normally gaseous hydrocarbon fraction containing propylene and propane and an acid gas selected from the group consisting of hydrogen sulfide and carbon dioxide with an aqueous solution of ethanolamine in admixture with an amount in the range between 0.1% and 10% by weight of the solution of a compound selected from the hydroxides, sulfides and carbonates of the alkali metals in the range between 0.1% and 10% by weight of the solution, said solution containing a heterogeneous mixture of organic salts, polymers, inorganic metal compounds and carbonaceous material, to remove substantially all of said acid gas from said hydrocarbon fraction, separating said hydrocarbon fraction substantially free of said acid gas from said aqueous solution, heating said separated aqueous solution containing absorbed acid gas to a temperature sufficient to generate steam and to remove absorbed acid gas therefrom, cooling said desorbed aqueous solution and contacting additional quantities of said acid gas containing hydrocarbon fraction with said desorbed and cooled aqueous solution.

11. A method for increasing the ability of an aqueous solution of an ethanolamine for absorbing acidic gases selected from the group consisting of hydrogen sulfide and carbon dioxide from hydrocarbon fluids containing them which comprises adding to said aqueous solution an amount of a compound selected from the group consisting of sodium hydroxide, sodium sulfide, and sodium carbonate sufficient to increase the ability of said aqueous solution for absorbing said gases and then contacting a hydrocarbon fluid containing an acid gas selected from the group consisting of hydrogen sulfide and carbon dioxide with said aqueous solution containing said added compound.

12. A method for increasing the ability of an aqueous solution of an ethanolamine for absorbing acidic gases selected from the group consisting of hydrogen sulfide and carbon dioxide from hydrocarbon fluids containing them which comprises adding to said aqueous solution an amount of a compound selected from the group consisting of the hydroxides, sulfides and carbonates of the alkali metals sufficient to increase the ability of said aqueous solution for absorbing said gases and then contacting a hydrocarbon fluid containing an acid gas selected from the group consisting of hydrogen sulfide and carbon dioxide with said aqueous solution containing said added compound.

13. A method for increasing the ability of an aqueous solution of an ethanolamine for absorbing acidic gases selected from the group consisting of hydrogen sulfide and carbon dioxide from hydrocarbon fluids containing them which comprises adding to said aqueous solution an amount of a compound selected from the group consisting of the hydroxides, sulfides and carbonates of the alkali metals sufficient to increase the ability of said aqueous solution for absorbing said gases and then contacting a hydrocarbon fluid containing an acid gas selected from the group consisting of hydrogen sulfide and carbon dioxide with said aqueous solution containing said added compound, heating the contacted ethanolamine solution containing said added compound to liberate absorbed acid gas and to reactivate the ethanolamine solution containing said added compound, and thereafter contacting the hydrocarbon fluid containing said acid gas with the reactivated ethanolamine solution containing said added compound to absorb additional amounts of said acid gas.

14. A method in accordance with claim 13 in which the hydrocarbon fluid is a normally gaseous hydrocarbon.

References Cited in the file of this patent

UNITED STATES PATENTS

| Re. 18,958 | Bottoms | Sept. 26, 1933 |
| 2,011,386 | Ulrich et al. | Aug. 13, 1935 |
| 2,031,632 | Bottoms | Feb. 25, 1936 |
| 2,122,544 | Conway | July 5, 1938 |
| 2,224,228 | Lunn et al. | Dec. 10, 1940 |
| 2,311,342 | Kerns et al. | Feb. 16, 1943 |
| 2,390,899 | Reed | Dec. 11, 1945 |

OTHER REFERENCES

Dow: "Methods Used for Dehydration of Oil-Field Emulsions," Reports of Investigation, Dept. of Interior, Bureau of Mines, Ser. No. 2,688, May 1925, 16 pages pamphlet.